United States Patent [19]

Kazama et al.

[11] 4,455,259

[45] Jun. 19, 1984

[54] PROCESS FOR RECOVERING ANIMAL HAIR GREASE

[75] Inventors: Ken Kazama, Kamakura; Ikuo Muramoto, Yokohama; Yoshinobu Kusunoki, Kyoto; Kenji Ozaki, Gifu; Hideyuki Fujii, Oogaki, all of Japan

[73] Assignees: Asahi Kasei Kogyo Kabushiki Kaisha; Toa Wool Spinning & Weaving Co., Ltd., both of Osaka, Japan

[21] Appl. No.: 428,012

[22] Filed: Sep. 29, 1982

[30] Foreign Application Priority Data

Jan. 11, 1982 [JP] Japan .................................. 57-1711

[51] Int. Cl.$^3$ ............................................... C07J 9/00
[52] U.S. Cl. ............................................... 260/397.25
[58] Field of Search ................................... 260/397.25

[56] References Cited

U.S. PATENT DOCUMENTS

| | | | |
|---|---|---|---|
| 2,655,428 | 10/1953 | Lundgren et al. | 8/139 |
| 2,723,281 | 11/1955 | Norman | 260/412.8 |
| 4,124,502 | 11/1978 | Leman | 210/21 |
| 4,138,416 | 2/1979 | Koresawa et al. | 260/397.25 |
| 4,207,244 | 6/1980 | Chaikin et al. | 260/397.25 |

*Primary Examiner*—Elbert L. Roberts

*Attorney, Agent, or Firm*—Armstrong, Nikaido, Marmelstein & Kubovcik

[57] ABSTRACT

Animal hair grease is recovered in a high yield from a scouring waste liquid obtained from a scouring process of a raw animal hair material with a hydrophobic organic solvent and containing a scouring extract derived from the raw animal hair material. The process for this comprises the steps of:

(A) converting the scouring waste liquid to a flock-forming liquid by the following operations, which may be carried out in any sequence,
  (a) adding water to the scouring waste,
  (b) adjusting the content of the scouring extract in the flock-forming liquid to 20% to 70% based on the entire weight of the flock-forming liquid,
  (c) adjusting the content of water in the flock-forming liquid to 2% to 110% based on the weight of the scouring extract, and
  (d) adjusting the temperature of the flock-forming liquid to 80° C. to 100° C., whereby flocks are formed in the flock-forming liquid;
(B) removing the flock from the flock-forming liquid, whereby a residual liquid containing therein purified animal hair grease is obtained; and
(C) recovering the animal hair grease from the residual liquid.

18 Claims, No Drawings

PROCESS FOR RECOVERING ANIMAL HAIR GREASE

FIELD OF THE INVENTION

The present invention relates to a process for recovering animal hair grease from a raw animal hair material. More particularly, the present invention relates to a process for recovering animal hair grease from scouring waste liquid obtained by scouring a raw animal hair material, for example, a raw loose animal hair mass or a raw animal fur, with a hydrophobic organic solvent.

BACKGROUND OF THE INVENTION

It is well-known that scouring waste liquid obtained from an organic solvent scouring process of a raw animal hair material contains animal hair grease which is useful in the field of medicine and cosmetics. Accordingly it is very important for the animal hair industry, including the wool industry, to recover the animal hair grease at an excellent quality and high efficiency.

Japanese Examined Patent Publication No. 35-10238 (U.S. Pat. No. 2,655,428) discloses a process for recovering wool grease from a scouring waste liquid obtained from an organic solvent scouring process of raw wool. In this process, the scouring waste liquid is mixed with water and a water-soluble alcohol so as to form flocks containing water-soluble substances and solid impurities such as sand, soil, and mud, derived from the raw wool material, in the mixture. The flocks are removed from the scouring waste liquid by means of a centrifuge. The resultant residual liquid is subjected to a process to evaporate the organic liquid and recover the wool grease.

Japanese Unexamined Patent Publication No. 56-57896 (U.S. Pat. No. 4,207,244) discloses another process for recovering wool grease. In this process, the flocks are formed in the scouring waste liquid containing the scouring extract and the organic solvent by using a water-soluble alcohol alone as the flock-forming agent.

As seen from the above-mentioned prior arts, the animal hair grease industry has believed that the procedure for removing water-soluble substance and solid impurities such as sand, soil, and mud from the scouring waste liquid containing the scouring extract and the organic solvent must include the use of water-soluble alcohol as a flock-forming agent.

However, the use of water-soluble alcohol as the flock-forming agent results in several disadvantages. That is, when the water-soluble alcohol is added to the scouring waste liquid, a portion of the water-soluble substances in the scouring extract is dissolved in the water-soluble alcohol and, therefore, is not contained in the resultant flocks. Even after the flocks are removed, the portion of the water-soluble substances are retained in the residual solution. When the wool grease is recovered from the residual solution by evaporating the organic solvent, the resultant wool grease contains the water-soluble substance. This causes unsatisfactory quality of the resultant wool grease.

Due to the above, the animal hair grease industry has sought a new process for high quality recovery of animal hair grease, for example, wool grease, from a scouring waste liquid obtained from a scouring process of a raw animal hair material with a hydrophobic organic solvent.

SUMMARY OF THE INVENTION

An object of the present invention is to provide a process for recovering animal hair grease having a high quality from a scouring waste liquid derived from a scouring process of a raw animal hair material with a hydrophobic organic solvent, in an excellent yield.

The above-mentioned object can be attained by the process of the present invention, which comprises the steps of:

(A) converting a scouring waste liquid, derived from a scouring process of a raw animal hair material with a hydrophobic organic solvent and containing therein a scouring extract from said raw animal hair material, to a flock-forming liquid by the following operations, which may be carried out in any sequence, (a) adding water to the scouring waste liquid, (b) adjusting the concentration of the scouring extract in the flock-forming liquid to 20% to 70% based on the entire weight of the flock-forming liquid, (c) adjusting the content of water in the flock-forming liquid to 2% to 110% based on the weight of the scouring extract, and (d) adjusting the temperature of the flock-forming liquid to 80° C. to 100° C., whereby flocks are formed in the flock-forming liquid;

(B) removing the flock from the flock-forming liquid, whereby a residual liquid containing therein purified animal hair grease is obtained; and (C) recovering the animal hair grease from the residual liquid.

DETAILED DESCRIPTION OF THE INVENTION

The scouring waste liquid to be treated in accordance with the process of the present invention is obtained from a process of scouring a raw animal hair material with a hydrophobic organic solvent.

The term "raw animal hair material" used herein refers to a raw, loose animal hair mass and raw animal fur.

The scouring waste liquid contains a scouring extract derived from the raw animal hair material and containing water-insoluble substances such as animal hair grease, water-soluble substances, and solid impurities, such as sand, soil, and mud.

In the process of the present invention, the scouring waste liquid containing therein the scouring extract is converted to a flock-forming liquid. The convention is effected by the following operations, which may be carried out in any sequence, (a) adding water to the scouring waste liquid, (b) adjusting the concentration of the scouring extract in the flock-forming liquid to 20% to 70% based on the entire weight of the flock-forming liquid, (c) adjusting the content of water in the flock-forming liquid to 2% to 110% based on the weight of the scouring extract, and (d) adjusting the temperature of the flock-forming liquid to 80° C. to 100° C.

As a result of the convertion, the water-soluble substances forms flocks in the flock-forming liquid. The solid impurities are contained in the flocks, and, therefore, the soluble substances and solid impurities are separated from the solution of the water-insoluble substances dissolved in the hydrophobic organic solvent.

In the process of the present invention, it is important that the flocks comprising the water-soluble substances and the solid impurities be formed in the flock-forming liquid without using water-soluble alcohol, which is also soluble in the hydrophobic organic solvent and which has been considered by the animal hair industry to be indispensable for separating the water-soluble substances from the water-insoluble substances in the scouring extract. That is, in the process of the present invention, the flocks can be formed by using water alone, which is substantially insoluble in the hydrophobic organic solvent, and by adjusting the content of water and the scouring extract in the flock-forming liquid and the temperature of the flock-forming liquid to specific values, as described above. This flock-forming phenomenon was completely unforeseen by experts in the animal hair industry before the present invention was completed and was discovered by the inventors of the present invention for the first time.

The flocks can be easily removed from the flock-forming liquid. The resultant residual liquid is substantially free from the water-soluble substances. Therefore, the animal hair grease obtained from the residual liquid has excellent purity and quality. Also, the flocks removed from the flock-forming liquid are substantially free from animal hair grease. Therefore, substantially no animal hair grease is lost in the recovery process and the animal hair grease is recovered at an excellent yield.

As stated above, the scouring waste liquid is derived from the scouring process in which the raw animal hair material is scoured with a hydrophobic organic solvent, and suint and other impurities on the raw animal hair material are extracted by the hydrophobic organic material, and the scoured animal hair material is separated from the scouring waste liquid containing the scouring extract.

The hydrophobic organic solvent is not limited to a specific type of solvent. The solvent need only be hydrophobic and effective for scouring the raw animal hair material. The hydrophobic organic solvent preferably consists of at least one member selected from the group consisting of 1,1,1-trichloroethane, tetrachloroethylene, trichloroethylene, methylene chloride, 1,1,2-trichloro-1,2,2-trifluoroethane, n-hexane, and orthodichlorobenzene. In order to obtain scoured animal hair material at a excellent quality, it is preferable to use 1,1,1-trichloroethane as the hydrophobic organic solvent.

The process of the present invention can be applied to any type of raw animal hair material, for example, raw wool, raw sheep fur, raw Cashmere goat hair mass, raw Cashmere goat fur, raw Angora rabbit hair mass, raw Angora rabbit fur, raw camel hair mass, and other animal hair masses and furs, for example, mouton, mink, and fox.

The process of the present invention will be explained hereinafter in reference to a specific process for recovering wool grease from a scouring waste liquid of a raw wool mass with a hydrophobic organic solvent. The process of the present invention is not limited to this specific example, however.

When a raw animal hair material is scoured with a hydrophobic organic solvent, the resultant scouring extract contains 50% to 90% by weight of hydrophobic substances, for example, grease; 10% to 50% by weight of hydrophilic substances, for example, suint; and a small amount of solid impurities, for example, sand, soil, and mud.

For example, when a standard grade of raw Australian merino wool mass is scoured with a hydrophobic organic solvent, the scouring extract contained in the resultant scouring waste liquid comprises approximately 80% by weight of hydrophobic wool grease and approximately 20% by weight of hydrophilic substances and solid impurities. In accordance with the process of the present invention, the scouring waste liquid is subjected to the flock-forming procedure comprising the operations of:

(a) adding water to the scouring waste liquid so as to cause the resultant flock-forming liquid to contain water, (b) adjusting the concentration of the scouring extract to 20% to 70%, preferably, 25% to 35%, based on the entire weight of the flock-forming liquid, (c) adjusting the content of water to 2% to 110%, preferably, 5% to 100%, based on the weight of the scouring extract, and (d) adjusting the temperature of the flock-forming liquid to 80° C. to 100° C., preferably, 85° C. to 95° C., so as to convert the scouring waste liquid to a flock-forming liquid. The above-mentioned operations (a) to (d) may be effected in any sequence.

When the resultant flock-forming liquid contains water in a content of less than 2% based on the weight of the scouring extract, the formation of flocks is unsatisfactory and, therefore, the quality of the recovered animal hair grease is unsatisfactory. When the content of water in the flock-forming liquid is more than 110% based on the weight of the scouring extract, the formation of flocks is also unsatisfactory, the resultant flocks are excessively soft and weak to an extent that the flocks cannot be separated by means of filtration, and, therefore, the quality of the resultant animal hair grease is unsatisfactory.

When the concentration of the scouring extract in the flock-forming liquid is less than 20% or more than 70%, based on the entire weight of the flock-forming liquid, the formation of flocks is unsatisfactory and the recovered animal hair grease exhibits unsatisfactory quality.

In order to obtain excellent quality animal hair grease, it is preferable that the content of water in the flock-forming liquid be in the range of from 0.6% to 45%, more preferably, 2% to 25%, of the entire weight of the flock-forming liquid.

Also, to promote the flock-formation, it is preferable that the content of the hydrophobic organic solvent in the flock-forming liquid be in the range of from 17% to 80%, more preferably, from 45% to 75%, based on the entire weight of the flock-forming liquid.

The conversion of the scouring waste liquid to the flock-forming liquid may be effected in any manner as long as the resultant flock-forming liquid satisfies the necessary conditions. For example, the flock-forming liquid may be prepared by directly mixing water to the scouring waste liquid obtained directly from the scouring process. When the content of the scouring extract in the scouring waste liquid is excessively large, the scouring waste liquid may be diluted with an additional amount of the hydrophobic organic liquid. When the content of the scouring extract in the scouring waste liquid is excessively small, the scouring waste liquid may be concentrated by evaporating a portion of the hydrophobic organic solvent from the scouring waste liquid.

Also, the step for converting the scouring waste liquid to the flock-forming liquid may include at least one operation for adding water to and at least one operation for evaporating a portion of the hydrophobic organic solvent from the scouring waste liquid, which operations may be carried out in any sequence.

Furthermore, the step for converting the scouring waste liquid to the flock-forming liquid may include at least one operation for removing solid impurities contained in the scouring waste liquid. This removing operation is effective for facilitating the separation of the flock from the flock-forming liquid.

The water-adding operation may be carried out after the operation for evaporating a portion of the hydrophobic organic liquid is completed. The operation for evaporating a portion of the hydrophobic organic solvent may be effected after the necessary amount of water is added. The operation for removing the solid impurities may be carried out either before, after, or during the procedure including at least one water-adding operation and at least one operation for evaporating a portion of the hydrophobic organic solvent.

The flock-forming liquid must be held at a temperature of 80° C. to 100° C., preferably, 85° C. to 95° C., for the time necessary for forming the flocks in the flock-forming liquid, usually, for one minute or more, preferably, for 5 to 30 minutes.

When the temperature of the flock-forming liquid is below 80° C., the formation of flocks is incomplete. When the temperature of the flock-forming liquid is above 100° C., the animal hair grease in the flock-forming liquid is sometimes degraded.

The operation for adjusting the temperature of the flock-forming liquid to the desired level may be carried out while refluxing vapor of the hydrophobic organic solvent, so as to prevent the loss of the hydrophobic organic solvent. Especially, when the boiling point of the hydrophobic organic solvent is lower than the desired flock-forming temperature, the temperature-adjusting operation may be carried out by placing the flock-forming liquid in a closed vessel and by applying pressure thereto. In another manner, the temperature-adjusting operation may be applied to the flock-forming liquid placed in an open vessel while allowing portions of the hydrophobic organic solvent and water to evaporate. That is, the temperature-adjusting operation may be carried out concurrently with the operations for adjusting the concentration of the scouring extract and the content of water in the flock-forming liquid.

In still another manner, for the purpose of facilitating the flock-removing procedure, an additional amount of the hydrophobic organic solvent may be added to the flock-forming liquid, after the flocks are formed therein but before the flocks are removed therefrom, so as to reduce the viscosity of the liquid containing the flock.

The flocks can be removed from the flock-forming liquid by a usual separating procedure, for example, the centrifugal method or filtering method. In another method, the liquid containing the flocks may be left standing at room temperature for approximately 12 hours, or more or at a temperature of 60° C. for approximately 5 hours or more, so as to allow the flocks to precipitate and, then, the precipitated flocks may be removed by means of decantation.

The residual liquid separated from the flocks is a solution of the animal hair grease alone dissolved in the hydrophobic organic solvent.

The animal hair grease is recovered from the residual liquid by evaporating the hydrophobic organic solvent at the boiling point thereof. It is preferable that the evaporating operation be carried out at a temperature of from 35° C. to 100° C. and, if necessary, under a reduced pressure, so as to prevent the undesirable degrading of the quality of the animal hair grease.

The evaporated hydrophobic organic solvent is recovered by condensation. The recovered hydrophobic organic solvent is quite free from the water-soluble substance. Also, in the process of the present invention, no water-soluble alcohol is used. Therefore, the recovered hydrophobic organic solvent can be used in a desired process, for example, a scouring process of a raw animal hair material, without refinement.

The recovered animal hair grease exhibits a satisfactory purity and quality and, therefore, is useful in the fields of medicines, cosmetics, textile-treating agents, and antirusting agents.

SPECIFIC EXAMPLES

The specific examples presented below will serve to more fully elaborate how the present invention is practiced. However, it should be understood that the examples are only illustrative and in no way limit the scope of the present invention.

EXAMPLES 1 THROUGH 3 AND COMPARATIVE EXAMPLES 1 AND 2

In each of Examples 1 through 3 and Comparative Examples 1 and 2, a raw wool mass was scoured with a scouring hydrophobic organic solvent consisting of 1,1,1-trichloroethane. The resultant scouring waste liquid contained a scouring extract and the hydrophobic organic solvent in the amounts indicated in Table 1.

The scouring waste liquid was converted to a flock-forming liquid by adding water in the amount indicated in Table 1 and by adjusting the concentrations of the scouring extract and water to the values indicated in Table 1 and adjusting the temperature of the flock-forming liquid to 90° C. The concentration of the hydrophobic organic solvent in the flock-forming liquid and the content of water based on the weight of the scouring extract are also indicated in Table 1.

When the flock-forming liquid was held at a temperature of 90° C. for 10 minutes, it was found that a number of flocks formed therein.

In each of Example 1 and Comparative Example 1, the heated flock-forming liquid was diluted with an additional amount of 1,1,1-trichloroethane to an extent that the concentration of the scouring extract was reduced to 30% by weight.

The flock-forming liquid was subjected to a centrifugal procedure at a centrifugal force of 2000 G for 20 seconds to separate the flocks.

The residual liquid was heated at a temperature of 74° C. to evaporate the hydrophobic organic solvent. A wool grease was obtained.

The wool grease was subjected to a Gardner hue test and ash measurement. The results of the test and measurement and a general evaluation of the quality of the resultant wool grease are indicated in Table 1.

Generally, the hue of wool grease varies depending on the contents of impurities, such as water-soluble substances. Usually, a high quality wool grease exhibits a hue represented by a Gardner value of 15 or less. Also, it is preferable that the wool grease exhibit an ash value of 0.5 or less.

Table 1 also shows the yield of the wool grease.

TABLE 1

| Example No. | Solvent Weight (ton) | Solvent Content (%) based on weight of flock-forming liquid | Scouring extract Weight (ton) | Scouring extract Concentration (%) based on weight of flock-forming liquid | Water content Weight (kg) | Water content Content (%) based on weight of flock-forming liquid | Content (%) based on weight of scouring extract | Wool Grease Yield (%) | Wool Grease Hue (Gardner value) | Wool Grease Ash (% wt) | General evaluation of quality |
|---|---|---|---|---|---|---|---|---|---|---|---|
| Comparative Example 1 | 4.9 | 29 | 12.1 | 71 | 270 | 1.6 | 2.2 | 90 | 16 | 0.80 | Poor |
| Example 1 | 9.9 | 58 | 6.8 | 40 | 270 | 1.6 | 4.0 | 90 | 15 | 0.48 | Good |
| Example 2 | 11.7 | 70 | 5.0 | 29 | 270 | 1.6 | 5.5 | 90 | 11 | 0.17 | Excellent |
| Example 3 | 13.0 | 77 | 3.7 | 22 | 270 | 1.6 | 7.3 | 90 | 14 | 0.43 | Good |
| Comparative Example 2 | 14.1 | 83 | 2.6 | 15 | 270 | 1.6 | 10.4 | 90 | 15 | 0.97 | Poor |

EXAMPLES 4 THROUGH 6 AND COMPARATIVE EXAMPLE 3

In each of Examples 4 through 6 and Comparative Example 3, a raw wool mass was scoured with a scouring hydrophobic organic solvent consisting of 1,1,1-trichloroethane. The resultant scouring waste liquid contained a scouring extract and the hydrophobic organic solvent in the amounts indicated in Table 2.

The scouring waste liquid was mixed with water in the amount indicated in Table 2. The contents (% by weight) of the hydrophobic organic solvent, the scouring extract and the water in the resultant flock-forming liquid are indicated in Table 2. Table 2 also shows the ratio (%) in weight of water to the scouring extract in the flock-forming liquid.

The flock-forming liquid was held at a temperature of 90° C. for 10 minutes so as to form a number of flocks. The heated flock-forming liquid was subjected to a centrifugal procedure at a centrifugal force of 2000 G for 20 minutes to separate the flocks.

The residual liquid was heated at a temperature of 74° C. to evaporate the hydrophobic organic liquid. A wool grease was obtained.

Table 2 also shows the quality and yield of the wool grease.

EXAMPLE 7 AND COMPARATIVE EXAMPLE 4

In each of Example 7 and Comparative Example 4, a raw wool mass was scoured with a scouring hydrophobic organic solvent consisting of 1,1,1-trichloroethane. The resultant scouring waste liquid contained a scouring extract and the hydrophobic organic solvent in the amounts indicated in Table 3.

The scouring waste liquid was mixed with water in the amount indicated in Table 3. The resultant flock-forming liquid contained the hydrophobic organic solvent, the scouring extract, and the water in the contents indicated in Table 3. Table 3 also shows the ratio (%) in weight of water to the scouring extract.

The flock-forming liquid was heated at a temperature of 90° C. for 10 minutes so as to form flocks therein. The heated flock-forming liquid was subjected to a separating procedure in which the ratio in weight of the wool grease to the hydrophobic organic solvent was adjusted to 25:100 and the adjusted flock-forming liquid was maintained in a separating vessel, equipped with a heating (cooling) jacket and coil, at a temperature of 60° C. for approximately 5 hours. It was found that the flocks floated up on the surface layer of the liquid. The floated-up flocks were removed so as to provide a residual liquid.

The residual liquid was heated to a temperature of 80° C. to evaporate the hydrophobic organic solvent. A wool grease was obtained. Table 3 shows the quality and yield of the wool grease.

TABLE 2

| Example No. | Solvent Weight (ton) | Solvent Content (%) based on weight of flock-forming liquid | Scouring extract Weight (ton) | Scouring extract Concentration (%) based on weight of flock-forming liquid | Water content Weight (kg) | Water content Content (%) based on weight of flock-forming liquid | Content (%) based on weight of scouring extract | Wool Grease Yield (%) | Wool Grease Hue (Gardner value) | Wool Grease Ash (% wt) | General evaluation of quality |
|---|---|---|---|---|---|---|---|---|---|---|---|
| Comparative Example 3 | 11.7 | 70 | 5 | 30 | 85 | 0.5 | 1.7 | 89 | 18 | 1.03 | Poor |
| Example 4 | 11.7 | 70 | 5 | 29 | 220 | 1.3 | 4.4 | 90 | 12 | 0.32 | Good |
| Example 5 | 11.7 | 70 | 5 | 29 | 270 | 1.6 | 5.5 | 90 | 11 | 0.17 | Excellent |
| Example 6 | 11.7 | 64 | 5 | 27 | 1600 | 8.7 | 32.0 | 94 | 12 | 0.39 | Good |

TABLE 3

| Example No. | Solvent Weight (ton) | Solvent Content (%) based on weight of flock-forming liquid | Scouring extract Weight (ton) | Scouring extract Concentration (%) based on weight of flock-forming liquid | Water content Weight (kg) | Water content Content (%) based on weight of flock-forming liquid | Water content Content (%) based on weight of scouring extract | Wool Grease Yield (%) | Wool Grease Hue (Gardner value) | Wool Grease Ash (% wt) | General evaluation of quality |
|---|---|---|---|---|---|---|---|---|---|---|---|
| Example 7 | 11.7 | 54 | 5 | 23 | 5.0 | 23 | 100 | 70 | 11 | 0.3 | Good |
| Comparative Example 4 | 11.7 | 52 | 5 | 22 | 5.7 | 26 | 114 | 70 | 16 | 1.5 | Poor |

EXAMPLES 8 THROUGH 10 AND COMPARATIVE EXAMPLES 5 AND 6

In each of Examples 8, 9, and 10 and Comparative Examples 5 and 6, the same procedures as those described in Example 5 were carried out, except that the flock-forming liquid was held at the temperatures and for the times indicated in Table 4. Table 4 also shows the quality, hue, and yield of the wool grease.

TABLE 4

| Example No. | Heating temperature (°C.) | Heating time (sec) | Wool grease Hue (Gardner value) | Wool grease General evaluation of quality | Wool grease Yield (%) |
|---|---|---|---|---|---|
| Comparative Example 5 | 70 | 60 | 14–15 | Slightly poor | 90 |
| Example 8 | 80 | 60 | <13 | Good | 90 |
| Example 9 | 90 | 60 | <13 | " | 90 |
| Example 10 | 100 | 60 | <13 | " | 90 |
| Comparative Example 6 | 110 | 60 | >16 | Poor | 90 |

EXAMPLES 11 THROUGH 14

In each of Examples 11 through 14, the same procedures as those described in Example 5 were carried out, except that the hydrophobic organic solvent consisted of the compounds indicated in Table 5 and the flock-forming liquid was heated at the temperatures and for the times indicated in Table 5. Table 5 also shows the quality, hue, and yield of the resultant wool grease.

TABLE 5

| Example No. | Solvent | Heating Temperature (°C.) | Heating Time (min) | Wool grease Hue (Gardner value) | Wool grease General evaluation of quality | Wool grease Yield (%) |
|---|---|---|---|---|---|---|
| 11 | Tetrachloroethylene | 90 | 5 | <13 | Excellent | 88 |
| 12 | Methylene chloride | 80 | 5 | <13 | " | 91 |
| 13 | n-hexane | 90 | 1 | <13 | " | 91.5 |
| 14 | Ortho-dichlorobenzene | 90 | 1 | <13 | " | 90 |

We claim:

1. A process for recovering animal hair grease from a raw animal hair material comprising the steps of:
   (A) providing a scouring waste liquid which is the product of the scouring of a raw animal hair material with a hydrophobic organic solvent and which contains a scouring extract from said raw animal hair material dissolved in said hydrophobic organic solvent,
   (B) converting said scouring waste liquid to a flock forming liquid by the following operations which may be carried out in any sequence,
   (a) adding water to said scouring waste liquid,
   (b) adjusting the concentration of said scouring extract in said flock-forming liquid to 20% to 70% based on the entire weight of said flock-forming liquid,
   (c) adjusting the content of water in said flock-forming liquid to 2% to 110% based on the weight of said scouring extract, and
   (d) adjusting the temperature of said flock-forming liquid to 80° C. to 100° C.,
   whereby flocks are formed in said flock-forming liquid;
   (C) removing said flock from said flock-forming liquid, whereby a residual liquid containing therein purified animal hair grease is obtained; and
   (D) recovering said animal hair grease from said residual liquid.

2. The process as claimed in claim 1, wherein the adjusted content of water in said flock-forming liquid is in the range of from 5% to 100% based on the weight of said scouring extract.

3. The process as claimed in claim 1, wherein the adjusted concentration of said scouring extract in said flock-forming liquid is in the range of from 25% to 35% based on the entire weight of said process-starting liquid.

4. The process as claimed in claim 1, wherein the adjusted content of water in said flock-forming liquid is in the range of from 0.6% to 45% based on the entire weight of said flock forming liquid.

5. The process as claimed in claim 4, wherein the adjusted content of water in said flock-forming liquid is in the range of from 2% to 25% based on the entire weight of said flock forming liquid.

6. The process as claimed in claim 1, wherein the adjusted content of said hydrophobic organic solvent in said flock-forming liquid is in the range of from 17% to 80% based on the entire weight of said flock-forming liquid.

7. The process as claimed in claim 6, wherein the adjusted content of said hydrophobic organic solvent in said flock-forming liquid is in the range of from 45% to 75% based on the entire weight of said flock-forming liquid.

8. The process as claimed in claim 1, wherein the adjusted temperature of said flock-forming liquid is in the range of from 85° C. to 95° C.

9. The process as claimed in claim 1, wherein said flock-forming liquid is held at the adjusted temperature for at least one minute.

10. The process as claimed in claim 9, wherein the time for which said flock-forming liquid is held at the adjusted temperature is 5 to 30 minutes.

11. The process as claimed in claim 1, wherein said hydrophobic organic solvent consists of at least one member selected from the group consisting of 1,1,1-trichloroethane, tetrachloroethylene, trichloroethylene, methylene chloride, 1,1,2-trichloro-1,2,2-trifluoroethane, n-hexane, and ortho-dichlorobenzene.

12. The process as claimed in claim 1, wherein said step of converting said scouring waste liquid to the flock-forming liquid includes at least one operation for adding water to said scouring waste liquid and at least one operation for evaporating a portion of said hydrophobic organic solvent, which operations may be carried out in any sequence.

13. The process as claimed in claim 1, wherein said step for converting said scouring waste liquid to said flock-forming liquid includes at least one operation for removing solid impurities contained in said scouring waste liquid.

14. The process as claimed in claim 12, wherein in said flock-forming liquid-preparing step, said water-adding operation is carried out after said operation for evaporating a portion of said hydrophobic organic liquid.

15. The process as claimed in claim 12, wherein in said flock-forming liquid-preparating step, said operation for evaporating a portion of said hydrophobic organic liquid is carried out after said water-adding operation is carried out.

16. The process as claimed in claim 1, wherein said separation of flocks is carried out after said flock-forming liquid is diluted with an additional amount of said hydrophobic organic solvent at the adjusted temperature.

17. The process as claimed in claim 1, wherein said separation of flocks is carried out by means of a centrifugal method.

18. The process as claimed in claim 1, wherein said recovery of animal hair grease is carried out by evaporating said hydrophobic organic solvent from said residual liquid.

* * * * *